US008665713B2

(12) United States Patent
Kawamoto et al.

(10) Patent No.: US 8,665,713 B2
(45) Date of Patent: Mar. 4, 2014

(54) RADIO COMMUNICATION SYSTEM, RADIO COMMUNICATION METHOD AND BASE STATION

(75) Inventors: Junichiro Kawamoto, Tokyo (JP); Akihito Hanaki, Yokohama (JP); Takahiro Hayashi, Yokosuka (JP); Yoshikazu Goto, Yokosuka (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 619 days.

(21) Appl. No.: 12/244,034

(22) Filed: Oct. 2, 2008

(65) Prior Publication Data

US 2009/0092104 A1   Apr. 9, 2009

(30) Foreign Application Priority Data

Oct. 5, 2007   (JP) ................. P2007-262333

(51) Int. Cl.
*H04L 12/26*   (2006.01)
(52) U.S. Cl.
USPC ........... 370/229; 370/338; 370/333; 370/331; 455/67.11; 455/67.13; 455/69
(58) Field of Classification Search
None
See application file for complete search history.

(56) References Cited

U.S. PATENT DOCUMENTS

2007/0021106 A1* 1/2007 Kawasaki et al. .......... 455/412.1
2007/0274257 A1* 11/2007 Bae et al. ..................... 370/328
2009/0262720 A1* 10/2009 Kwon et al. ................. 370/342

FOREIGN PATENT DOCUMENTS

| EP | 0 847 220 | 6/1998 |
| EP | 1 775 982 A1 | 4/2007 |
| JP | 2004-537203 A | 12/2004 |
| JP | 2006-525695 A | 11/2006 |
| JP | 2007-043251 A | 2/2007 |
| WO | 03/001725 A1 | 1/2003 |
| WO | 2004/100404 A1 | 11/2004 |
| WO | WO 2006077556 A1 * | 7/2006 |
| WO | 2006/084004 A2 | 8/2006 |

OTHER PUBLICATIONS

"Rate-request proposal", Qualcomm, Ericsson, Nokia, Panasonic, 3GPP TSG-RAN WG2 Meeting #45bis, R2-050179, Sophia Antipolis, France, Jan. 10-14, 2005, 8 pages.
ETSI TS 125 319 V7.2.0 (Mar. 2007), Universal Mobile Telecommunications System(UMTS); Enhanced uplink; Overall description; Stage 2 (3GPP TS 25.319 version 7.2.0 Release 7), 45 pages.
3GPP TS 25.321 V6.13.0 (Jun. 2007), 3rd Generation Partnership Project; Technical Specification Group Radio Access Network; Medium Access Control (MAC) protocol specification (Release 6), 94 pages.

(Continued)

*Primary Examiner* — Kibrom T Hailu
*Assistant Examiner* — Zewdu A Beyen
(74) *Attorney, Agent, or Firm* — Marvin A. Motsenbocker; MOTS Law, PLLC

(57) ABSTRACT

In a radio communication system in which a radio terminal 10 transmits, to a base station 100, uplink user data via an enhanced dedicated physical data channel, the base station 100 includes a base station side transmitter unit (scheduling unit 120a) configured to transmit, to the radio terminal 10, transmission rate decrease data for instructing a decrease of the transmission rate assigned to the radio terminal 10, when the uplink user data is not transmitted from the radio terminal 10 to the base station 100 by using the transmission rate assigned to the radio terminal 10.

6 Claims, 11 Drawing Sheets

(56) References Cited

OTHER PUBLICATIONS

3GPP TS 25.321 V7.5.0 (Jun. 2007), 3rd Generation Partnership Project; Technical Specification Group Radio Access Network; Medium Access Control (MAC) protocol specification (Release 7), 141 pages.

Office communication of Mar. 9, 2011, issued in the counterpart Chinese patent application.
The office communication of Jun. 19, 2012, issued in the counterpart Japanese patent application.
The office communication of Sep. 11, 2012, issued in the counterpart Japanese patent application.

* cited by examiner

RADIO COMMUNICATION SYSTEM, RADIO COMMUNICATION METHOD AND BASE STATION

CROSS REFERENCE TO RELATED APPLICATION

This application is based upon and claims the benefit of priority from prior Japanese Patent Application No. 2007-262333, filed on Oct. 5, 2007; the entire contents of which are incorporated herein by reference.

BACKGROUND OF THE INVENTION

1. Field of the Invention

The present invention relates to a radio communication system in which uplink user data is transmitted to a base station from a radio terminal via an enhanced dedicated physical data channel, and also relates to a radio communication method and a base station.

2. Description of the Related Art

Heretofore, a radio communication system including a base station and a radio network controller has been known. In the radio communication system, the base station has a single or multiple cells, and a radio communication is performed between each of the cells and a plurality of radio terminals. The radio network controller controls a plurality of base stations, and assigns a radio resource to the plurality of the radio terminals. Note that such a technique (hereinafter referred to as first technique) is sometimes referred to as R99 (Release 99) or the like.

For the purpose of improving the throughput and shortening the delay time, and the like, there has recently been proposed a technique in which a base station assigns the radio resources for uplink user data transmitted from each of the radio terminals to the base station (network side). Note that such a technique (hereinafter referred to as a second technique) is sometimes referred to as the high speed uplink packet access (HSUPA), the enhanced uplink (EUL) or the like.

Each of the cells functions as a serving cell or as a non-serving cell. A transport block size (TBS) is determined based on the transmission rate (for example, a scheduling grant (SG)) of the uplink user data, and is controlled by transmission rate control date transmitted from the serving cell and the non-serving cell. The transmission rate control data includes an absolute grant (AG) for controlling an absolute value of the transmission rate and a relative grant (RG) for controlling a relative value of the transmission rate (for example, see 3GPP TS25.321 Ver. 7.5.0).

Here, the uplink user data is transmitted to the base station from the radio terminals via an enhanced dedicated physical data channel (E-DPDCH). The absolute grant (AG) is transmitted from the radio base station to the radio terminals via an E-DCH absolute grant channel (E-AGCH). The relative grant (RG) is transmitted from the radio base station to the radio terminals via an E-DCH relative grant channel (E-RGCH).

The serving cell transmits the absolute grant (AG) and the relative grant (RG) to the radio terminals. Meanwhile, the non-serving cell transmits, to the radio terminals, only the relative grant (RG) without transmitting the absolute grant (AG).

SUMMARY OF THE INVENTION

Meanwhile, the base station can transmit the AG or the RG at each TTI (Transmission Time Interval). However, when a large number of radio terminals are existed in the cell controlled by the base station, and when the AG or the RG is transmitted to each of the large number of the radio terminals at each TTI, downlink radio resources are increased and a processing load of the base station is also increased.

Therefore, it is practical that a transmission timing of the AG or the RG (a control timing of the SG) is set not one TTI cycle but a predetermined cycle (for example, several tens to several hundreds msec) longer than one TTI.

Meanwhile, when the AG or the RG is transmitted by the predetermined cycle, the SG assigned to each of the radio terminals is maintained at the same value over the predetermined cycle. Therefore, the transmission rate of the uplink user data is not properly assigned to each of the radio terminals. As a result, uplink radio resources may be wasted.

One aspect of the present invention is summarized as a radio communication system in which a radio terminal transmits, to a base station, uplink user data via an enhanced dedicated physical data channel and the base station transmits, to the radio terminal, transmission rate control data for controlling a transmission rate of the uplink user data. The base station includes a base station side transmitter unit (scheduling unit 120a) configured to transmit, to the radio terminal, transmission rate decrease data, which is one of the transmission control data for instructing a decrease of the transmission rate assigned to the radio terminal, when the uplink user data is not transmitted from the radio terminal to the base station by using the transmission rate assigned to the radio terminal.

According to this aspect, the base station side transmitter unit transmits, to the radio terminal, the transmission rate decrease data for instructing the decrease of the transmission rate, when the radio terminal does not transmit uplink user data by using the transmission rate assigned to the radio terminal.

In other words, the base station transmits the transmission rate decrease data for instructing the decrease of the transmission rate assigned to the radio terminal, when the radio terminal has not used all of the transmission rate assigned to the radio terminal.

Therefore, the transmission rate of the uplink user data can be properly controlled.

In the above-described aspect, the radio terminal includes a terminal side transmitter unit (communication unit 11) configured to transmit, to the base station, uplink scheduling information including at least buffer information indicating a buffer amount of the uplink user data stored in the radio terminal. The base station further includes a determination unit (determination unit 125) configured to determine whether buffer information indicating that the uplink user data is stored in the radio terminal is obtained. When the buffer information indicating that the uplink user data is stored in the radio terminal is not obtained, the base station side transmitter unit transmits, to the radio terminal, the transmission rate decrease data.

As the case where the above-described buffer information cannot be obtained, for example, the following cases are conceivable. (1) when the UL scheduling information cannot be received from the radio terminal 10 (2) when the buffer information (TEBS) included in the UL scheduling information received from the radio terminal 10 is indicating "buffer amount=0".

In the above-described aspect, the base station further includes a determination unit (determination unit 125) configured to specify a usage rate of the transmission rate assigned to the radio terminal, on the basis of the uplink user data received from the radio terminal, and to determine whether the usage rate is lower than a usage rate threshold. The base station side transmitter unit transmits, to the radio terminal, the transmission rate decrease data, when the usage rate is lower than the usage rate threshold.

In the above-described aspect the base station further includes a counter (counter 126; the first counter or the second counter) configured to count a period for which the buffer information indicating that the uplink user data is stored in the radio terminal is not obtained. The base station side transmitter unit transmits, to the radio terminal, the transmission rate decrease data, when the period counted by the counter exceeds a predetermined period.

In the above-described aspect, the base station further includes a counter (counter 126; the third counter) configured to count a period for which the usage rate is lower than the usage rate threshold. The base station side transmitter unit transmits, to the radio terminal, the transmission rate decrease data, when the period counted by the counter exceeds a predetermined period.

One aspect of the present invention is summarized as a radio communication method in which a radio terminal transmits, to a base station, uplink user data via an enhanced dedicated physical data channel and the base station transmits, to the radio terminal, transmission rate control data for controlling a transmission rate of the uplink user data. The radio communication method includes: transmitting, from the base station to the radio terminal, transmission rate decrease data, which is one of the transmission control data for instructing a decrease of the transmission rate assigned to the radio terminal, when the uplink user data is not transmitted from the radio terminal to the base station by using the transmission rate assigned to the radio terminal.

One aspect of the present invention is summarized as a base station configured to receive uplink user data from a radio terminal via an enhanced dedicated physical data channel, and to transmit, to the radio terminal, transmission rate control data for controlling a transmission rate of the uplink user data. The base station includes: a base station side transmitter unit configured to transmit, to the radio terminal, transmission rate decrease data, which is one of the transmission control data for instructing a decrease of the transmission rate assigned to the radio terminal, when the uplink user data is not transmitted from the radio terminal to the base station by using the transmission rate assigned to the radio terminal.

DESCRIPTION OF THE EMBODIMENTS

Figure 1:
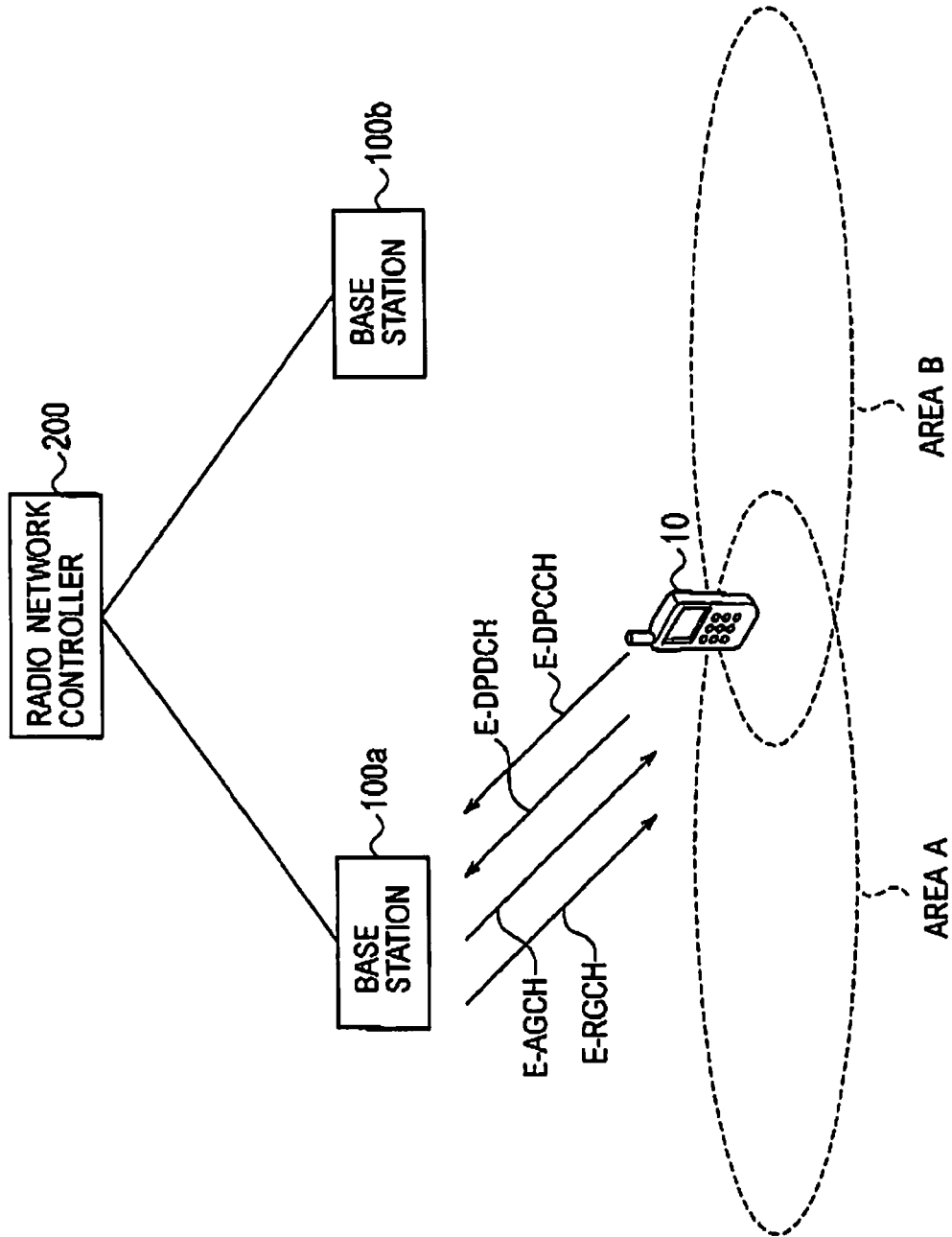
FIG. 1 is a view showing a radio communication system according to a first embodiment.

With reference to the drawings, a radio communication system according to an embodiment of the present invention will be described below. Note that, in the following description of the drawings, the same or similar parts will be denoted by the same or similar reference numerals.

However, it should be noted that the drawings are schematic and ratios of dimensions and the like are different from actual ones. Therefore, specific dimensions and the like should be determined by taking into consideration the following description. Moreover, as a matter of course, also among the drawings, there are included portions In which dimensional relationships and ratios are different from each other.

First Embodiment (Configuration of Radio Communication System)

With reference to the accompanying drawings, a configuration of a radio communication system according to a first embodiment will be described below. FIG. 1 is a view showing the radio communication system according to the first embodiment. As shown in FIG. 1, the radio communication system includes a radio terminal 10, a base station 100 (a base station 100*a* and a base station 100*b*), and a radio network controller 200.

The radio terminal 10 transmits uplink user data to the base station 100*a*. Specifically, the radio terminal 10 transmits the uplink user data to the base station 100 via a dedicated physical data channel (DPDCH) in a framework in which the radio network controller 200 assigns radio resources and the like. Note that such framework is sometimes referred to as R99 (Release 99) or the like.

In this framework, the radio terminal 10 transmits uplink control data to the base station 100*a* via a dedicated physical control channel (DPCCH).

Meanwhile, the radio terminal 10 transmits uplink user data to the base station 100*a* via an enhanced dedicated physical data channel (E-DPDCH), in a framework in which the base station 100 assigns radio resources and the like. Note that this framework is sometimes referred to as the high speed uplink packet access (HSUPA), the enhanced uplink (EUL) or the like.

Here, the uplink user data is divided into blocks for each transmission time interval (TTI), that is, for each process (HARQ process). Each of the blocks (MAC-e PDU) is transmitted by use of a process (hereinafter referred to as an active process) assigned to the radio terminal 10.

Moreover, one cycle (HARQ RTT) is configured of a predetermined number of processes (process #1 to process #n) and each of the cycle is repeated. Note that the number of processes included In one cycle is set according to a TTI length. For example, when the TTI length is 2 ms, the number of processes included in one cycle is "8". When the TTI length is 10 ms, the number of processes included in one cycle is "4".

Here, the radio terminal 10 has a table associating a transmission power ratio with the transmission rate. This table is used for transmitting the uplink user data via the E-DPDCH. The transmission power ratio is a ratio of a transmission power of the E-DPDCH to a transmission power of the DPCCH (E-DPDCH/DPCCH). The transmission rate is represented by a transport block size (TBS).

The transmission power ratio assigned to the radio terminal 10 will be hereinafter referred to as a scheduling grant (SG). Note that the transmission power ratio and the transmission rate are associated one-to-one with each other. Thus, the scheduling grant (SG) may be considered not only as a term representing the transmission power ratio assigned to the radio terminal 10 but also as a term representing the transmission rate assigned to the radio terminal 10.

Note that, as described later, the radio terminal 10 updates the SG according to transmission rate control data (AG or RG) received from the base station 100a (see 3GPP TS25.321 Ver. 7.5.0 11.8.1.3 "Scheduling grant Update"). Subsequently, the radio terminal 10 determines a transmission rate (that is, TBS) corresponding to the SG by referring to the table associating the transmission power ratio with the transmission rate (see 3GPP TS25.321 Ver. 7.5.0 11.8.1.4 "E-TFC Selection").

In a framework in which the base station 100 assigns the radio resources and the like, the radio terminal 10 transmits uplink control data to the base station 100a via the enhanced dedicated physical control channel (E-DPCCH) or the like. The uplink control data includes UL scheduling information and the like, which is referred to by the base station 100a when the base station 100a assigns the radio resources.

The UL scheduling information includes "HLID (Highest priority Logical Channel ID)", "TEBS (Total E-DCH Buffer Status)", "HLBS (Highest priority Logical Channel Buffer Status)", "UPH (User Power Headroom)" and the like (see 3GPP TS25.321 Ver. 7.5.0 9.2.5.3.2 "Scheduling Information").

"HLID" is an identifier for identifying the highest priority logical channel among logical channels transmitting the uplink user data.

"TEBS" is buffer information indicating a total amount (buffer amount) of the uplink user data stored in a transmission buffer provided in the radio terminal 10.

"HLBS" is a total amount (buffer amount) of uplink user data to be transmitted by the logical channel identified by the HLID, among the uplink user data stored in the transmission buffer provided in the radio terminal 10.

"UPH" is a transmission power ratio that is a ratio of a maximum UE transmission power to a transmission power of the DPCCH. The maximum UE transmission power is a maximum transmission power that can be used by the radio terminal 10. For example, the UPH is represented by "maximum UE transmission power"/"transmission power of DPCCH".

Figure 2:
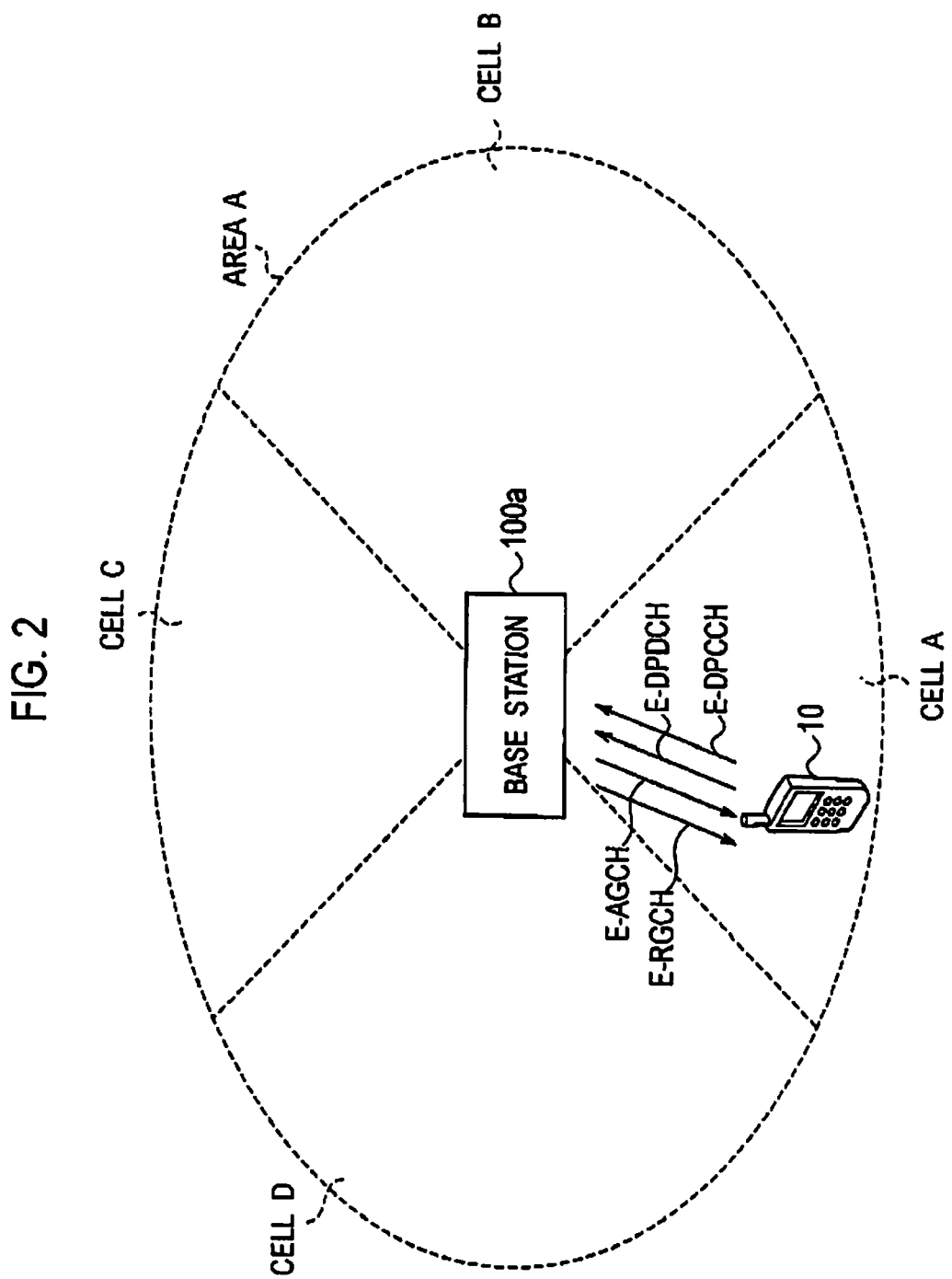
FIG. 2 is a view showing the radio communication system according to the first embodiment.

As shown in FIG. 2, the base station 10a controls a plurality of cells (cells A to D), and each of the plurality of cells communicates with the radio terminal 10 located In the each of the plurality of cells. Each of the cells can function as a serving cell, or a non-serving cell.

Note that the "cell" is basically used as a term representing a function communicating with the radio terminal 10. The "cell" is sometimes used as a term representing an area within which the radio terminal 10 is located.

For example, in FIG. 2, the radio terminal 10a performs a communication according to an instruction from an EUL scheduler provided in the cell A (In other words, the radio terminal performs a communication according to an AG received from the cell A via E-AGCH). In this example, the cell A is a serving cell for the radio terminal 10a and the cells B to D are non-serving cells for the radio terminal 10a. Meanwhile, the radio terminal 10a is referred to as a serving terminal for the cell A and as a non-serving terminal for the cells B to D.

The base station 100a receives the uplink user data from the radio terminal 10 via the data channel such as the DPDCH or the E-DPDCH. Meanwhile, the base station 100a transmits, to the radio terminal 10, transmission rate control data for controlling a transmission rate of the uplink user data to be transmitted via the E-DPDCH. Note that the transmission rate control data includes an absolute grant (AG) for controlling an absolute value of the transmission rate, and a relative grant (RG) for controlling a relative value of the transmission rate.

The absolute grant (AG) is data (Index) directly specifying the transmission power ratio (E-DPDCH/DPCCH) to be assigned to the radio terminal 10 (see 3GPP TS25.212 Ver. 7.5.0 4.10.1A.1 "Information field mapping of the Absolute Grant Value").

As described above, the absolute grant (AG) is a command directly specifying the transmission rate value without relying on the current transmission rate.

The relative grant (RG) is data ("Up", "Down" and "Hold") relatively specifying the transmission power ratio (E-DPDCH/DPCCH) assigned to the radio terminal 10 (see 3GPP TS25.321 Ver. 7.5.0 9.2.5.2.1 "Relative Grants").

As described above, the relative grant (RG) is a command relatively controlling the current transmission rate. Specifically, the relative grant (RG) includes an increase command "Up" for instructing an increase of the current transmission rate, a retention command "Hold" for instructing a retention of the current transmission rate, and a decrease command "Down" for instructing a decrease of the current transmission rate. Here, the increase command instructs the increase of the transmission rate by a predetermined amount. Further, the decrease command instructs the decrease of the transmission rate by a predetermined amount. The predetermined amount for the increase may be the same as or smaller than the predetermined amount for the decrease.

The base station 100a transmits the absolute grant (AG) to the radio terminal 10 via the E-DCH absolute grant channel (E-AGCH). The base station 100a transmits the relative grant (RG) to the radio terminal 10 via the E-DCH relative grant channel (E-RGCH).

For example, the serving cell (here, the cell A) transmits the AG to the radio terminal 10 via the E-AGCH and transmits the RG to the radio terminal 10 via the E-RGCH. Meanwhile, the non-serving cell (here, the cell B) transmits the RG to the radio terminal 10 via the E-RGCH without transmitting the AG to the radio terminal 10 via the E-AGCH.

It should be note that, in FIG. 1, the channels (the DPDCH, the DPCCH and the like) used in the R99 are merely omitted for simplifying the description. It should also be noted that multiple number of the radio terminals 10 existed in each of the cells are omitted in the description.

Further, the cell used as the serving cell by the radio terminal 10 is not limited to one cell but may be more than one cell.

(Configuration of Radio Terminal)

Figure 3:
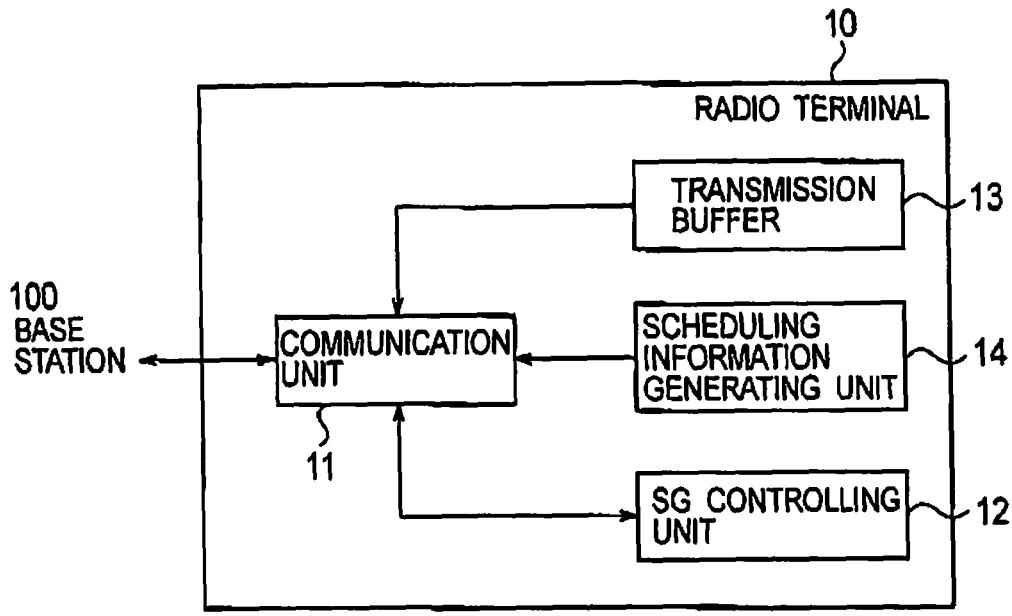
FIG. 3 is a block diagram showing a radio terminal 10 according to the first embodiment.

With reference to the accompanying drawings, description will be given of a configuration of the radio terminal according to the first embodiment. FIG. 3 is a block diagram showing the radio terminal 10 according to the first embodiment.

As shown in FIG. 3, the radio terminal 10 includes a communication unit 11, a SG controlling unit 12, a transmission buffer 13 and a scheduling information generating unit 14.

The communication unit 11 communicates with the base station 100. Specifically, the communication unit 11 transmits the uplink user data to the base station 100 via the E-DPDCH. The communication unit 11 transmits the uplink control data (for example, the above-described UL scheduling information) to the base station 100 via the E-DPCCH.

Meanwhile, the communication unit 11 receives, from the base station 100, transmission rate control data (the AG, the RG, or the like) for controlling the transmission rate of the uplink user data.

The SG controlling unit 12 controls the SG assigned to the uplink user data. The SG controlling unit 12 has a table associating the transmission power ratio (SG) with the transmission rate (TBS).

As described above, the SG is controlled by the AG or the RG received from the base station 100. The transmission rate of the uplink user data is selected from a range not exceeding the TBS associated with the SG.

The transmission buffer 13 stores the uplink user data. The above-described communication unit 11 transmits the uplink user data stored in the transmission buffer 13.

The scheduling information generating unit 14 generates the UL scheduling information, which is referred to by the base station 100a when the base station 100a assigns the radio resources. Specifically, the UL scheduling information is referred to when the base station 100a controls the SG assigned to the radio terminal 10. As described above, the UL scheduling information includes, "HLID", "TEBS (buffer information)", "HLBS", "UPH" and the like.

(Configuration of Base Station)

Figure 4:
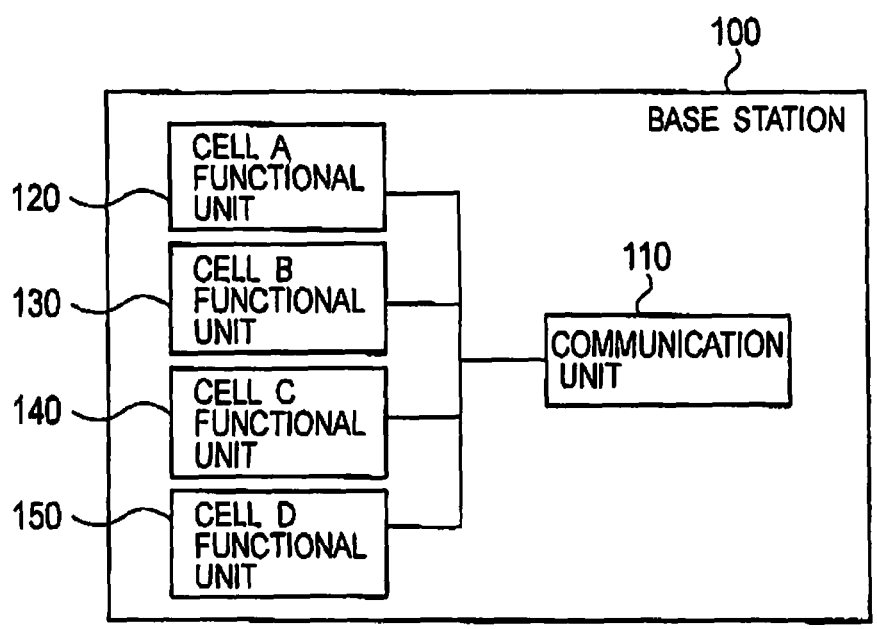
FIG. 4 is a block diagram showing a base station 100 according to the first embodiment.

With reference to the accompanying drawings, description will be given of a configuration of the base station according to the first embodiment. FIG. 4 is a block diagram showing the base station 100 according to the first embodiment.

As shown In FIG. 4, the base station 100 includes a communication unit 110, a cell A functional unit 120, a cell B functional unit 130, a cell C functional unit 140 and a cell D functional unit 150.

The communication unit 110 communicates with the radio terminal 10 located in the cells A to D. Here, the plurality of the radio terminals 10 is located in the cells A to D, respectively. Specifically, the communication unit 110 receives uplink user data from each of the plurality of radio terminals 10 via the data channel such as the DPDCH or the E-DPDCH. Further, the communication unit 110 receives uplink control data from each of the plurality of radio terminals 10 via the control channel such as the DPCCH or the E-DPCCH. Meanwhile, the communication unit 110 transmits the control data (AG or RG) to each of the plurality of radio terminals 10 via the control channel such as the E-AGCH and the E-RGCH.

Note that the communication unit 110 also communicates with upper apparatuses (such as a radio network controller, a switching apparatus or the like), which controls the base station 100.

The cell A functional unit 120 functions as a serving cell for radio terminals 10 located in the cell A. Meanwhile, the cell A functional unit 120 functions as a non-serving cell for radio terminals 10 located In the cells B to D.

The cell B functional unit 130 functions as a serving cell for radio terminals 10 located in the cell B. Meanwhile, the cell B functional unit 130 functions as a non-serving cell for radio terminals 10 located in the cells A, C and D.

The cell C functional unit 140 functions as a serving cell for radio terminals 10 located in the cell C. Meanwhile, the cell C functional unit 140 functions as a non-serving cell for radio terminals 10 located In the cells A, B and D.

The cell D functional unit 150 functions as a serving cell for radio terminals 10 located In the cell D. Meanwhile, the cell D functional unit 150 functions as a non-serving cell for radio terminals 10 located in the cells A to C.

(Configuration of Cell)

Figure 5:
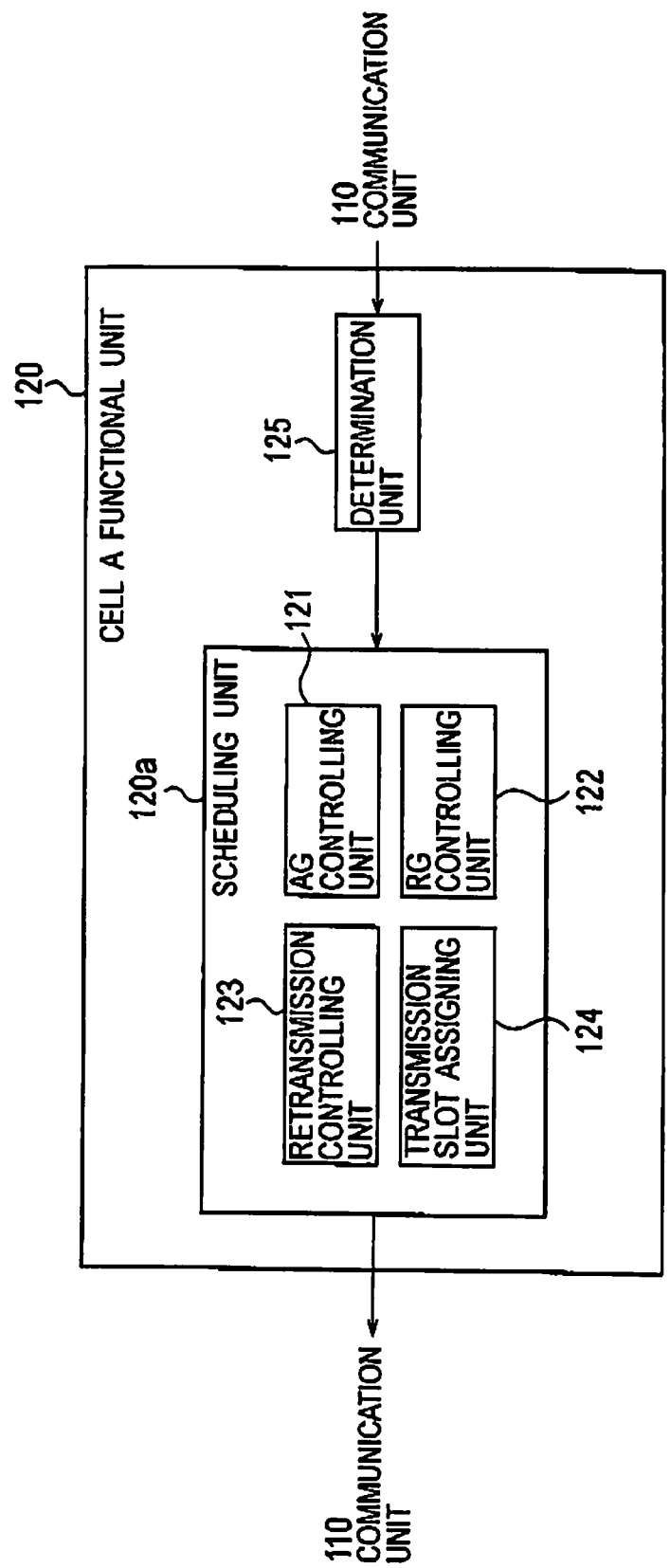
FIG. 5 is a block diagram showing a cell A functional unit 120 according to the first embodiment.

With reference to the accompanying drawings, description will be given of a configuration of the cell according to the first embodiment. FIG. 5 is a block diagram showing the cell (the cell A functional unit 120) according to the first embodiment. Here, description will be given for an example in which the cell A functional unit 120 functions as a serving cell.

As shown in FIG. 5, the cell A functional unit 120 includes: a scheduling unit 120a and a determination unit 125.

The scheduling unit 120a includes an AG controlling unit 121, an RG controlling unit 122, a retransmission controlling unit 123 and a transmission slot assigning unit 124. The scheduling unit 120a is operated in a MAC-e (Media Access Control Enhanced) layer.

The AG controlling unit 121 transmits an AG via the E-AGCH to the radio terminal 10. Note that the AG is a command for directly specifying a value of the transmission rate without relying on the current transmission rate.

The RG controlling unit 122 transmits an RG via the E-RGCH to the radio terminal 10 (serving radio terminal of the cell A). Note that the RG includes the increase command "Up" for instructing the increase of the current transmission rate, the retention command "Hold" for instructing the retention of the current transmission rate, and the decrease command "Down" for instructing the decrease of the current transmission rate. As described above, the increase command "Up" instructs the increase of the transmission rate by a predetermined amount and the decrease command "Down" instructs the decrease by a predetermined amount. The predetermined amount for the increase may be the same as or smaller than the predetermined amount for the decrease.

Here, the AG controlling unit 121 and the RG controlling unit 122 refers to the UL scheduling information and the like that is received from the radio terminal 10, and controls the SG to be assigned to the radio terminal 10. It is practical that a control timing of the SG (a transmission timing of the AG or the RG) is not one TTI cycle but a predetermined cycle (for example, several ten msec to several hundred msec) longer than one TTI.

The retransmission controlling unit 123 determines, for each block (for each process), whether or not an error is occurred In the uplink user data. Thereafter, the retransmission controlling unit 123 requests the radio terminal 10 to retransmit a block In which an error is occurred (hereinafter referred to as an error block). Here, a retransmission control technique is a HARQ (Hybrid Automatic Repeat Request) technique for combining a block firstly transmitted from the radio terminal 10 (hereinafter referred to as a transmission block) with a block retransmitted from the radio terminal 10 (hereinafter referred to as a retransmission block).

The transmission slot assigning unit 124 assigns, to the radio terminal 10, a transmission slot (that is, a process included In one TTI) to be used for transmitting the uplink user data (block) via the E-DPDCH. Note that the radio terminal 10 transmits the transmission block or the retransmission block to the base station 100 by using the process (active process) assigned by the transmission slot assigning unit 124.

The determination unit 125 determines whether the buffer information (TEBS) Indicating that the uplink user data is stored in the transmission buffer of the radio terminal 10, is obtained. As the case where the above-described buffer information cannot be obtained, for example, the following cases are conceivable.

(1) when the UL scheduling information cannot be received from the radio terminal 10

(2) when the buffer information (TEBS) included in the UL scheduling information received from the radio terminal 10 is Indicating "buffer amount=0"

Here, the scheduling unit 120a transmits, to the radio terminal 10, transmission rate control data (transmission rate decrease data) for instructing a decrease of the transmission rate (SG) assigned to the radio terminal 10, when the uplink user data is not transmitted from the radio terminal 10 by using the SG assigned to the radio terminal 10.

To be more specific, when the buffer information (TEBS) is not obtained, the scheduling unit 120a transmits, to the radio terminal 10, the transmission rate decrease data for instructing the decrease of the SG.

For example, as the transmission rate decrease data, the AG controlling unit 121 transmits, to the radio terminal 10, an AG (Zero Grant) specifying "0" for the SG assigned to the radio terminal 10. Further, as the transmission rate decrease data, the AG controlling unit 121 may transmit, to the radio terminal 10, an AG ("Inactive") limiting the use of active processes assigned to the radio terminal 10.

It should be noted that, the processing of controlling the transmission rate (SG) based on the information that the uplink user data is not stored in the radio terminal 10 is basically performed independently from the processing of controlling the transmission rate (SG) by a predetermined cycle (several ten msec to several hundred msec) longer than one TTI.

(Example of Reduction in Radio Resources (SG))

Figure 6:
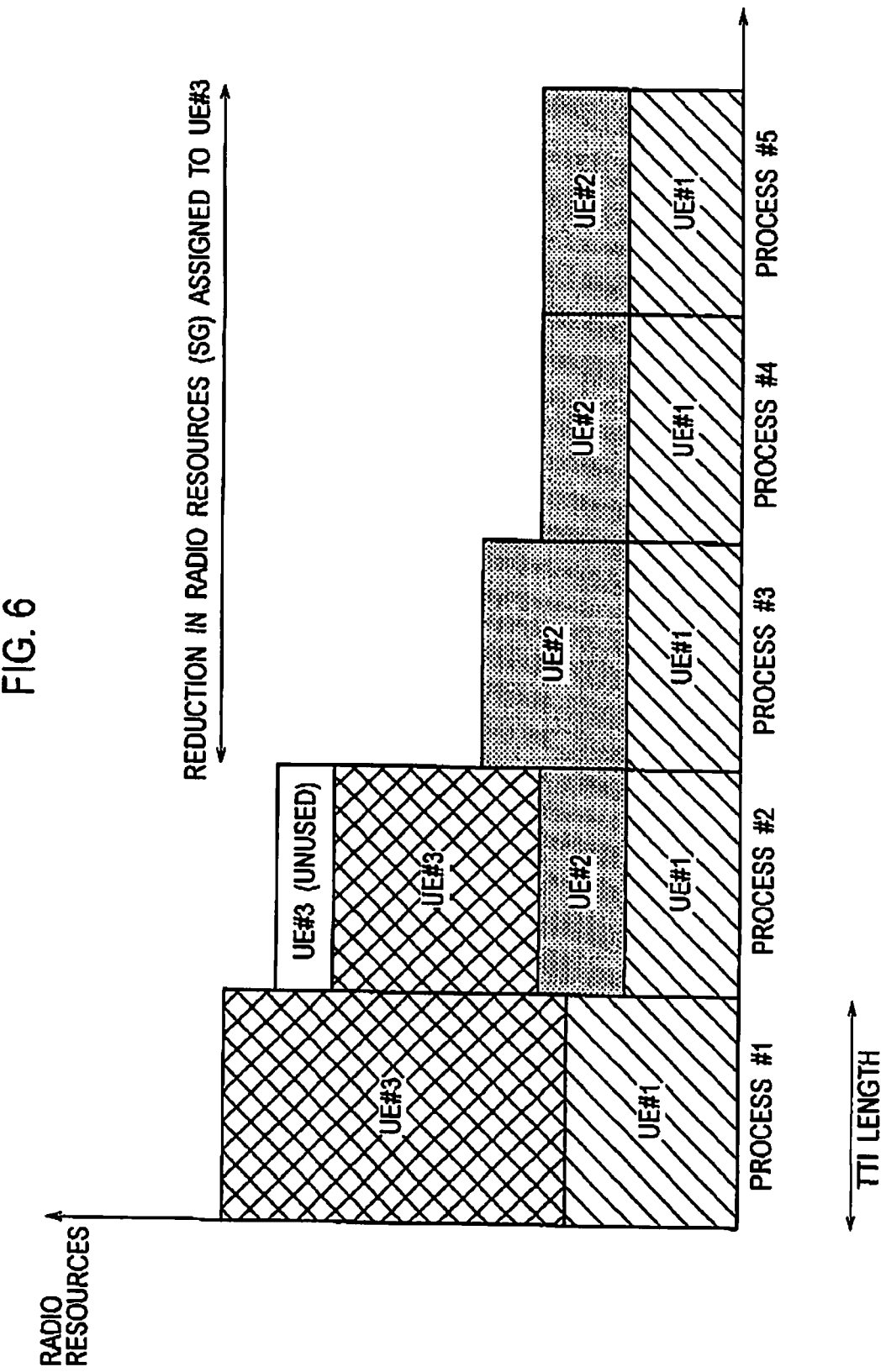
FIG. 6 is a view for explaining an example of reduction In radio resources (SG) according to the first embodiment.

With reference to the drawing, description will be given below of an example of a reduction in radio resources (SG) according to the first embodiment. FIG. 6 is a view showing the example of the reduction in the radio resources (SG) according to the first embodiment. In FIG. 5, the horizontal axis indicates process numbers and the vertical axis indicates radio resources (SG) of the radio terminal 10 assigned by the base station 100.

As shown in FIG. 6, in the process #1, the base station 100 assigns the radio resources (SG) to the radio terminal 10 (UE#1) and the radio terminal 10 (UE#3).

In the process #2, the base station 100 controls the radio resources (SG) assigned to the radio terminal 10 (UE#1) to the radio terminal 10 (UE#3) by transmitting transmission power control data (AG or RG) generated based on various information ("HLID", "TEBS (buffer information)", "HLBS" and "UPH") included in the UL scheduling information. Specifically, the base station 100 newly assigns the radio resources (SG) to the radio terminal 10 (UE#2). The base station 100 reduces the radio resources (SG) assigned to the radio terminal 10 (UE#1) and to the radio terminal 10 (UE#3). Note that the radio terminal 10 (UE#3) has not used all of the assigned radio resources (SG).

Here, considered is the case where, in the process #2, the base station 100 has received, from the radio terminal 10 (UE#3), buffer information (TEBS) Indicating that the uplink user data is not stored in the radio terminal 10 (UE#3).

In processes #3 to #5, the base station 100 transmits the AG (Zero Grant) or the AG (Inactive) to the radio terminal 10 (UE#3) and reduces the radio resources (SG) assigned to the radio terminal 10 (UE#3) to "0". Note that the base station 100 transmits the transmission power control data (AG or RG) generated based on the various information included in the UL scheduling information and controls the radio resources (SG) assigned to the radio terminal 10 (UE#2).

(Operations of Base Station (Cell))

Figure 7:
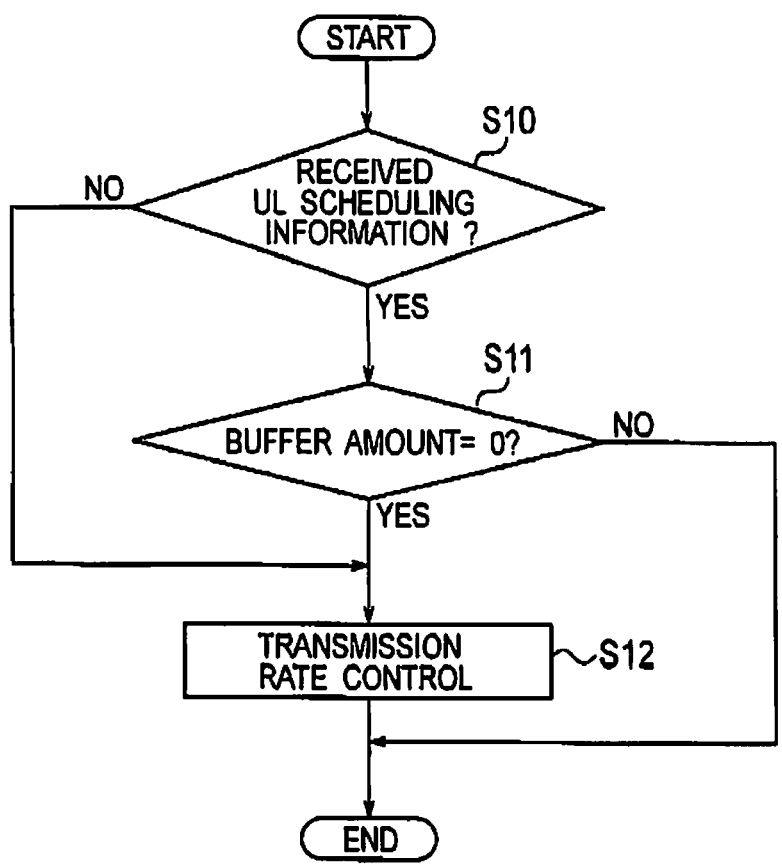
FIG. 7 is a flowchart showing operations of the base station 100 (cell) according to the first embodiment.

With reference to the accompanying drawings, description will be given below of operations of the base station (cell) according to the first embodiment. FIG. 7 is a flowchart showing operations of the base station 100 (cell) according to the first embodiment. Note that the processings shown in FIG. 7 are repeated by a predetermined cycle (for example, one TTI).

As shown In FIG. 7, in Step 10, the base station 100 determines whether the UL scheduling information has been received from the radio terminal 10 that uses the own of the base station 100 as the serving cell. When the UL scheduling information has been received, the base station 100 moves to a processing of Step 11. On the other hand, when the UL scheduling information has not been received, the base station 100 moves to a processing of Step 12.

In Step 11, the base station 100 refers to the buffer information (TEBS) included in the UL scheduling information and determines whether the buffer amount indicated by the buffer information is "0". When the buffer amount is "0", the base station 100 moves to the processing of Step 12.

On the other hand, when the buffer amount is not "0", in other words, when the uplink user data is stored in the radio terminal 10, the processing is terminated. Here, the base station 100 generates the transmission power control data (AG or RG) based on the various information ("HLID", "TEBS (buffer information)", "HLBS" and "UPH") included in the UL scheduling information, and transmits the transmission power control data (AG or RG) to the radio terminal 10, at the control timing of the SG assigned to the radio terminal 10.

Here, as described above, it is practical that the control timing of the SG (the transmission timing of the AG or the RG) is not one TTI cycle but a predetermined cycle (for example, several ten msec to several hundred msec) longer than one TTI.

In Step 12, the base station 100 transmits, to the radio terminal 10, transmission rate control data (transmission rate decrease data) for instructing the decrease of the SG assigned to the radio terminal 10.

For example, as the transmission rate decrease data, the AG controlling unit 121 transmits, to the radio terminal 10, an AG (Zero Grant) specifying "0" for the SG assigned to the radio terminal 10. Further, as the transmission rate decrease data, the AG controlling unit 121 may transmit, to the radio terminal 10, an AG ("Inactive") limiting the use of active processes assigned to the radio terminal 10.

(Operations and Effects)

In the first embodiment, the base station 100 transmits, to the radio terminal 10, the transmission rate decrease data for instructing the decrease of the transmission rate (SG), when the uplink user data is not transmitted from the radio terminal 10 to the base station 100 by using the transmission rate assigned to the radio terminal 10.

To be more specific, the base station 100 transmits, to the radio terminal 10, the transmission rate decrease data for instructing the decrease of the transmission rate, when the buffer information (TEBS) indicating that the uplink user data is stored in the radio terminal 10, is not obtained.

As described above, when it is determined that the uplink user data is not transmitted from the radio terminal 10 by using the transmission rate assigned to the radio terminal 10, the base station 100 transmits, to the radio terminal 10, the transmission rate decrease data for instructing the decrease of the transmission rate (SG).

Therefore, the transmission rate of the uplink user data can be properly controlled.

Second Embodiment

With reference to the accompanying drawings, a second embodiment will be described below. The following description is mainly given of differences between the first embodiment described above and the second embodiment.

Specifically, although it in not particularly mentioned in the first embodiment described above, in the second embodiment, a base station 100 transmits, to a radio terminal 10, transmission rate control data (transmission rate decrease data) for Instructing a decrease of an SG, when a period for which the buffer information (TEBS) indicating that uplink user data is stored in the radio terminal 10 is not obtained, exceeds a predetermined period.

(Configuration of Cell)

Figure 8:
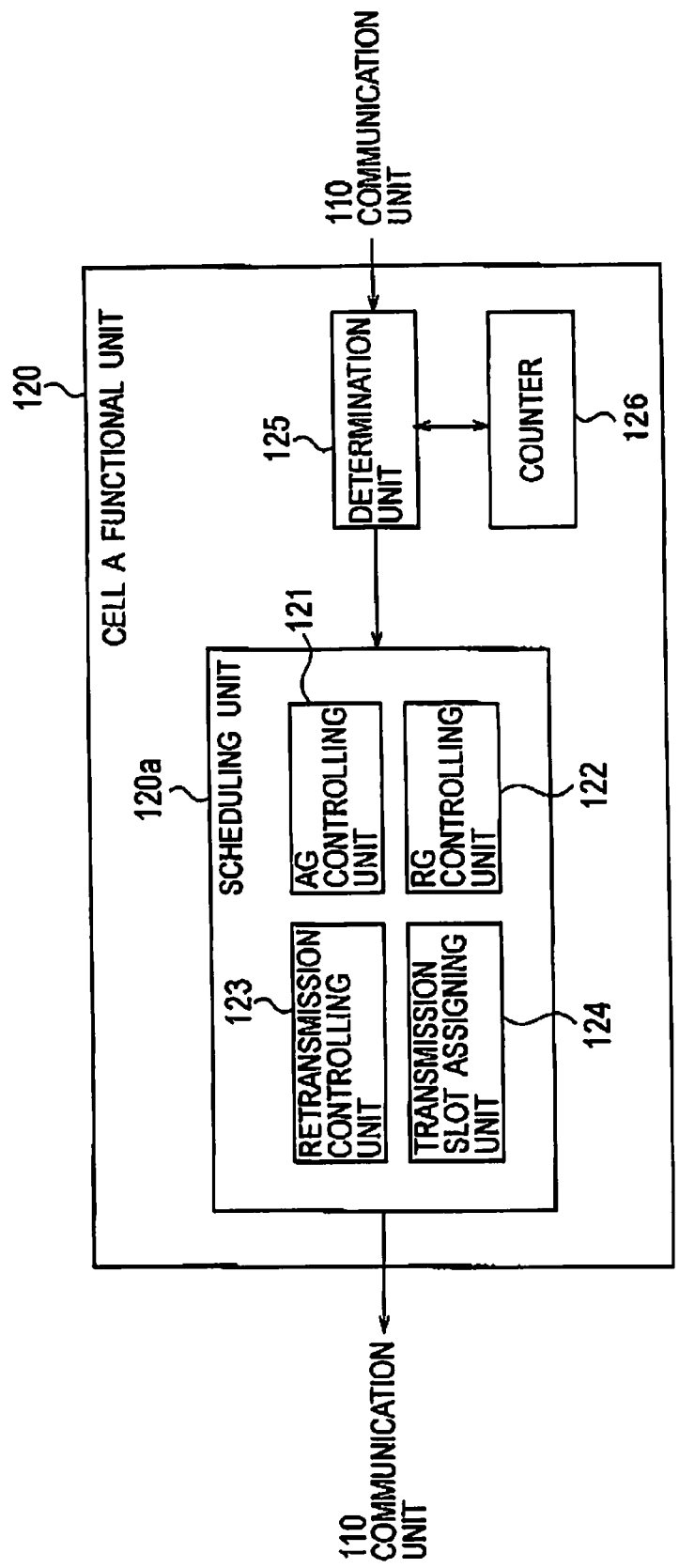
FIG. 8 is a block diagram showing a cell A functional unit 120 according to a second embodiment.

With reference to the accompanying drawings, description will be given below of a configuration of a cell according to the second embodiment. FIG. 8 is a block diagram showing a cell (a cell A functional unit 120) according to the second embodiment. Note that, in FIG. 8, the same constituent components as those shown in FIG. 5 are denoted by the same reference numerals.

As shown in FIG. 8, the cell A functional unit 120 includes a counter 126 in addition to the configuration shown in FIG. 5. The counter 126 includes a first counter and a second counter.

The first counter counts a period for which the UL scheduling information cannot be received from the radio terminal 10. The first counter is reset when the UL scheduling information is received.

The second counter counts a period for which the buffer information (TEBS) included in the UL scheduling information received from the radio terminal 10 is a value indicating "buffer amount=0". The second counter is reset when the buffer information (TEBS) indicating that the buffer amount is other than "0", i.e. the buffer information (TEBS) indicating that the uplink user data is stored in the radio terminal 10, is obtained.

The scheduling unit 120a described above transmits, to the radio terminal 10, the transmission rate decrease data for instructing the decrease of the SG, when a value counted by the first counter exceeds a first threshold. In other words, the scheduling unit 120a transmits the transmission rate decrease data to the radio terminal 10, when the period for which the UL scheduling information cannot be received exceeds a predetermined period.

The scheduling unit 120a described above transmits, to the radio terminal 10, the transmission rate decrease data for instructing the decrease of the SG, when a value counted by the second counter exceeds a second threshold. In other words, the scheduling unit 120a transmits, to the radio terminal 10, the transmission rate decrease data, when the period for which the buffer information (TEBS) is the value indicating "buffer amount=0", exceeds a predetermined period.

(Operations of Base Station (Cell))

Figure 9:
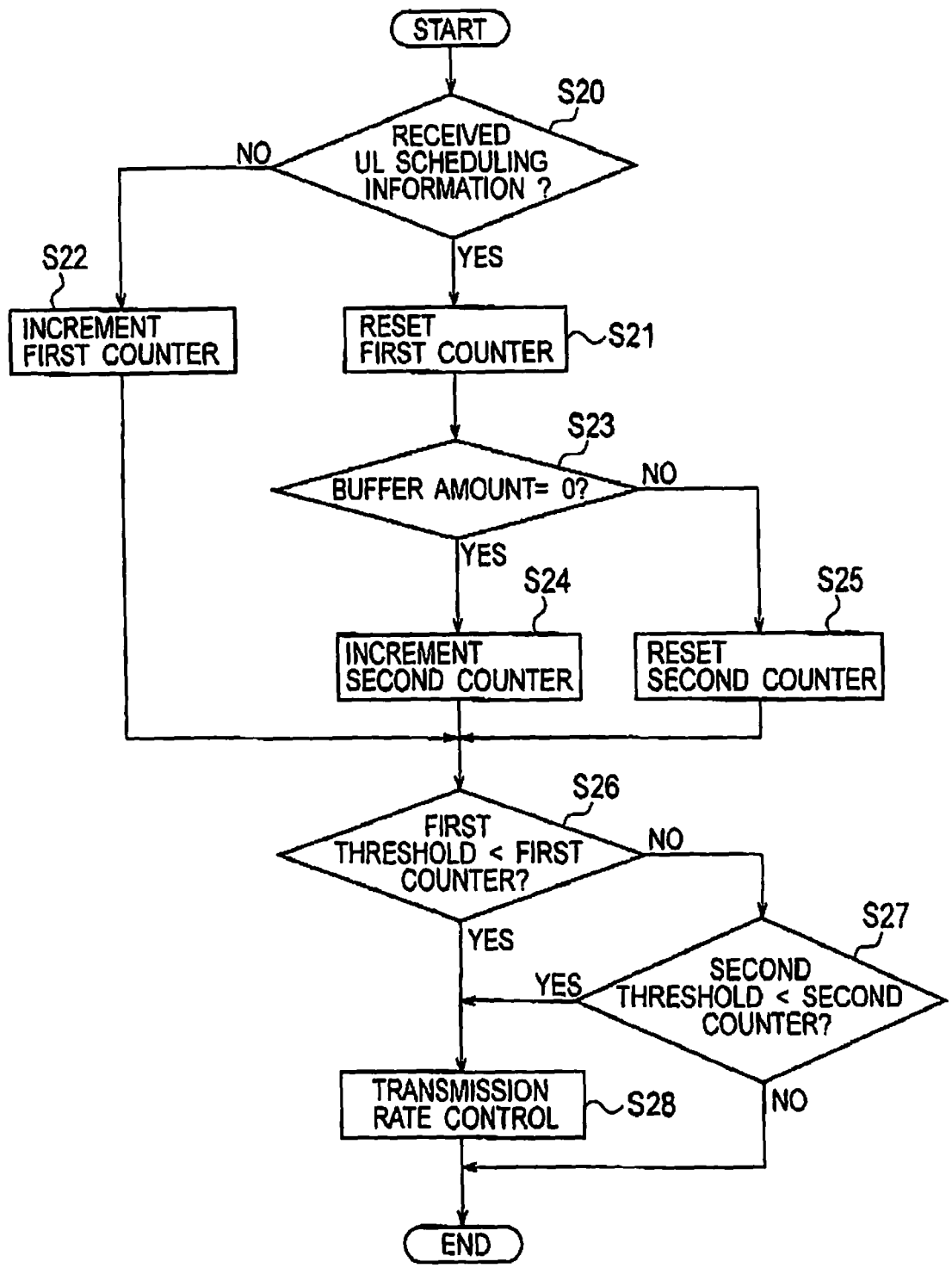
FIG. 9 is a flowchart showing operations of a base station 100 (cell) according to the second embodiment.

With reference to the accompanying drawings, description will be given below of operations of the base station (cell) according to the second embodiment. FIG. 9 is a flowchart showing operations of the base station 100 (cell) according to the second embodiment. Note that the processing shown In FIG. 9 is repeated by a predetermined cycle (for example, one TTI).

As shown in FIG. 9, in Step 20, the base station 100 determines whether the UL scheduling information has been received from the radio terminal 10 that uses the cell controlled by the base station 100 as the serving cell. When the UL scheduling information has been received, the base station 100 moves to a processing of Step 21. On the other hand, when the UL scheduling information has not been received, the base station 100 moves to a processing of Step 22.

In Step 21, the base station 100 resets the first counter. In Step 22, the base station 100 increments the first counter.

In Step 23, the base station 100 refers to the buffer information included in the UL scheduling information and determines whether the buffer amount indicated by the buffer information (TEBS) is "0". When the buffer amount is "0", the base station 100 moves to the processing of Step 24. On the other hand, when the buffer amount is not "0", the base station 100 moves to a processing of Step 25.

In Step 24, the base station 100 increments the second counter. In Step 25, the base station 100 resets the second counter.

In Step 26, the base station 100 determines whether or not a value counted by the first counter exceeds a first threshold. When the value counted by the first counter exceeds the first threshold, the base station 100 moves to a processing of Step 28. On the other hand, when the value counted by the first counter does not exceed the first threshold, the base station 100 moves to a processing of Step 27.

In Step 27, the base station 100 determines whether or not a value counted by the second counter exceeds a second threshold. When the value counted by the second counter exceeds the second threshold, the base station 100 moves to the processing of Step 28. On the other hand, when the value counted by the second counter does not exceed the second threshold, the base station 100 terminates the processing.

In Step 28, the base station 100 transmits, to the radio terminal 10, the transmission rate control data (transmission rate decrease data) for instructing the decrease of the SG assigned to the radio terminal 10.

Here, considered is a case where the value counted by the first counter does not exceed the first threshold and the value counted by the second counter does not exceed the second threshold.

In such case, as in the case of the first embodiment, the base station 100 generates the transmission power control data (AG or RG) based on the various information ("HLID", "TEBS (buffer information)", "HLBS" and "UPH") included in the UL scheduling information, and transmits the transmission power control data (AG or RG) to the radio terminal 10, at the control timing of the SG assigned to the radio terminal 10.

(Operations and Effects)

In the second embodiment, the base station 100 transmits, to the radio terminal 10, the transmission rate decrease data for Instructing the decrease of the transmission rate (SG), when the period for which the buffer information (TEBS) indicating that the uplink user data is stored in the radio terminal 10 is not obtained, exceeds the predetermined period.

Therefore, an excessive decrease of the transmission rate (SG) assigned to the radio terminal 10 can be suppressed.

Third Embodiment

With reference to the accompanying drawings, a third embodiment will be described below. The following description is mainly given of differences between the first embodiment described above and the third embodiment.

Specifically, in the first embodiment described above, the base station 100 transmits, to the radio terminal 10, the transmission rate decrease data for instructing the decrease of the SG, when the buffer information (TEBS) indicating that the uplink user data is stored in the radio terminal 10 is not obtained.

Meanwhile, in the third embodiment, a base station 100 transmits, to a radio terminal 10, the transmission rate decrease data for instructing the decrease of the SG, when a ratio of a measured transmission rate to a predicted transmission rate (hereinafter referred to as a usage rate) is lower than a usage rate threshold.

Here, the predicted transmission rate indicates a transmission rate specified by the radio resources (SG) assigned to the radio terminal 10. The predicted transmission rate is recognized at the base station 100 and is notified to the base station 100 by transmitting the AG or the RG. The measured transmission rate indicates a transmission rate specified by an amount of the uplink user data received from the radio terminal 10.

(Configuration of Cell)

A configuration of a cell according to the third embodiment will be described below. The cell (a cell A functional unit 120) according to the third embodiment has the same configuration as that of the first embodiment (FIG. 5).

A determination unit 125 specifies a predicted transmission rate by use of the SG assigned to the radio terminal 10. The SG assigned to the radio terminal 10 is recognized by the base station 100 and is notified from the base station 100 by transmitting the AG or the RG. Meanwhile, the determination unit 125 specifies the measured transmission rate by an amount of the uplink user data received from the radio terminal 10.

Subsequently, the determination unit 125 determines whether or not a usage rate (measured transmission rate/predicted transmission rate) is lower than the usage rate threshold indicating the ratio of the measured transmission rate to the predicted transmission rate.

It should be note that, in the third embodiment, as a matter of course, the measured transmission rate is not more than the predicted transmission rate. Therefore, a range of the usage rate threshold is a value "0" to "1".

Here, a scheduling unit 120a transmits, to the radio terminal 10, the transmission rate control data (transmission rate decrease data) for instructing the decrease of the SG assigned to the radio terminal 10, when the usage rate (measured transmission rate/predicted transmission rate) is lower than the usage rate threshold.

For example, as the transmission rate decrease data, the AG controlling unit 121 transmits, to the radio terminal 10, an AG specifying the SG (predetermined value) lower than the SG assigned to the radio terminal 10. Further, as the transmission rate decrease data, an RG controlling unit 122 may transmit, to the radio terminal 10, a decrease command "Down" for instructing the decrease of the SG assigned to the radio terminal 10.

Note that a range of the decrease of the SG assigned to the radio terminal 10 may be determined according to a difference (unused radio resources) obtained by subtracting the measured transmission rate from the predicted transmission rate. To be more specific, the decreased amount of the SG is determined to be larger when the amount of the unused radio resources is larger.

It should be noted that, the processing of controlling the transmission rate (SG) based on the information that the uplink user data is not stored in the radio terminal 10 is basically performed independently from the processing of controlling the transmission rate (SG) by a predetermined cycle (several ten msec to several hundred msec) longer than one TTI.

(Example of Reduction in Radio Resources (SG))

Figure 10:
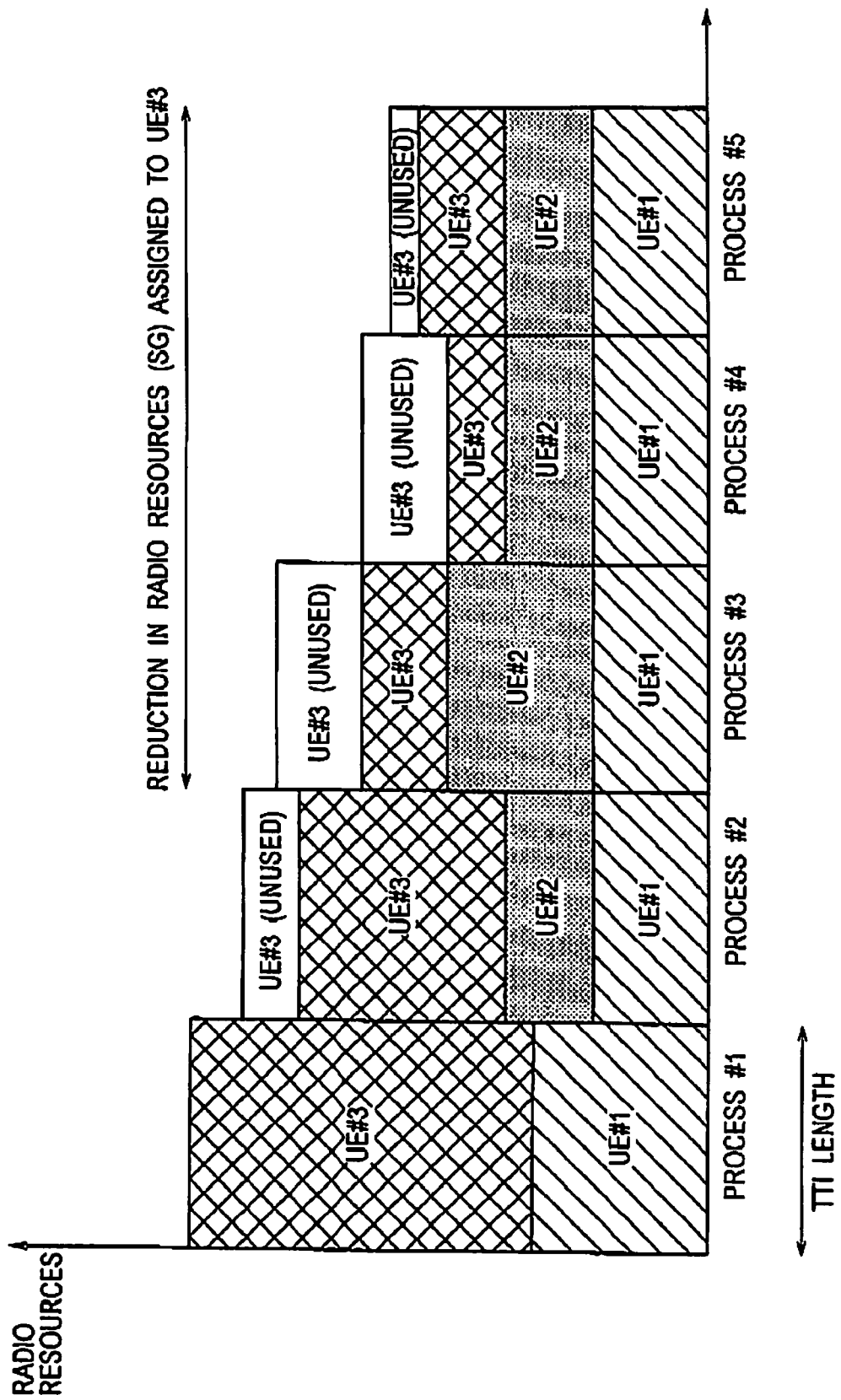
FIG. 10 is a view for explaining an example of reduction in radio resources (SG) according to a third embodiment.

With reference to the accompanying drawings, description will be given below of an example of reduction in radio resources (SG) according to the third embodiment. FIG. 10 is a view showing the example of reduction in the radio resources (SG) according to the third embodiment. In FIG. 10, the horizontal axis Indicates process numbers and the vertical axis Indicates radio resources (SG) assigned to the radio terminal 10 by the base station 100.

As shown In FIG. 10, in a process #1, the base station 100 assigns the radio resources (SG) to the radio terminal 10 (UE#1) and the radio terminal 10 (UE#3).

In the process #2, the base station 100 controls the radio resources (SG) assigned to the radio terminal 10 (UE#1) to the radio terminal 10 (UE#3) by transmitting transmission power control data (AG or RG) which is generated based on various information ("HLID", "TEBS (buffer information)", "HLBS" and "UPH") included in the UL scheduling information. Specifically, the base station 100 newly assigns the radio resources (SG) to the radio terminal 10 (UE#2). The base station 100 reduces the radio resources (SG) assigned to the radio terminal 10 (UE#1) and to the radio terminal 10 (UE#3).

Here, the radio terminal 10 (UE#3) has not used all of the assigned radio resources (SG). More specifically, the radio terminal 10 (UE#3) does not transmit the uplink user data by using the transmission rate corresponding to the assigned radio resources (SG).

Therefore, in processes #3 to #5, the base station 100 reduces the radio resources (SG) assigned to the radio terminal 10 (UE#3) by transmitting the transmission power control data (AG or RG). Note that a range of the reduction in the radio resources (SG) may be determined according to a difference (unused radio resources) obtained by subtracting the measured transmission rate from the predicted transmission rate.

(Operations of Base Station (Cell))

Figure 11:
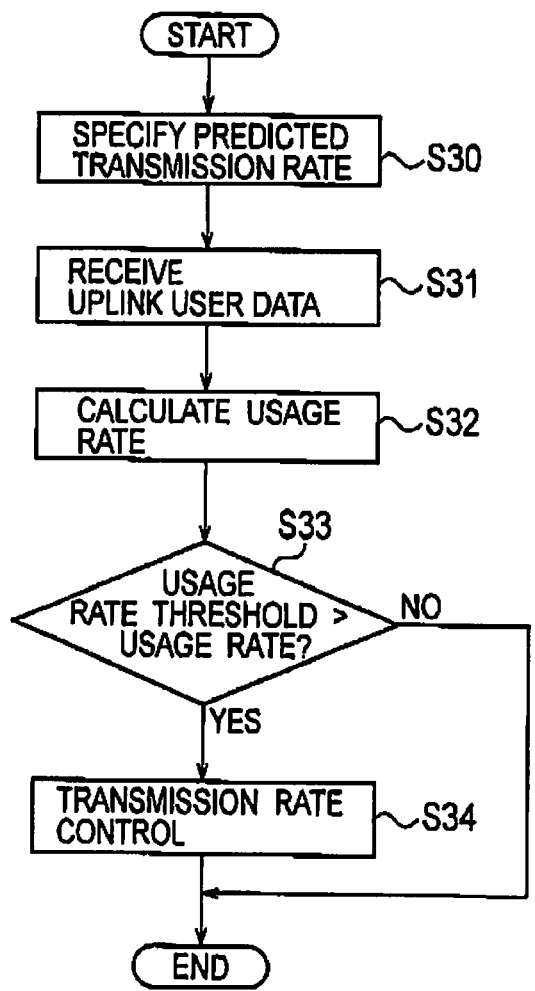
FIG. 11 is a flowchart showing operations of a base station 100 (cell) according to the third embodiment.

With reference to the accompanying drawings, description will be given below of operations of the base station (cell) according to the third embodiment. FIG. 11 is a flowchart showing operations of the base station 100 (cell) according to the third embodiment.

As shown in FIG. 11, in Step 30, the base station 100 specifies the predicted transmission rate by use of the SG assigned to the radio terminal 10.

In Step 31, the base station 100 receives the uplink user data from the radio terminal 10. Subsequently, the base station 100 specifies the measured transmission rate by an amount of the uplink user data received from the radio terminal 10.

In Step 32, the base station 100 calculates the ratio of the measured transmission rate to the predicted transmission rate (hereinafter referred to as the usage rate).

In Step 33, the base station 100 determines whether or not the usage rate is lower than the usage rate threshold. When the usage rate is lower than the usage rate threshold, the base station 100 moves to a processing of Step 34. On the other hand, when the usage rate is not lower than the usage rate threshold, the base station 100 terminates the processing.

In Step 34, the base station 100 transmits, to the radio terminal 10, the transmission rate control data (transmission rate decrease data) for instructing the decrease of the SG assigned to the radio terminal 10.

For example, as the transmission rate decrease data, the AG controlling unit 121 transmits, to the radio terminal 10, an AG specifying the SG (predetermined value) lower than the SG assigned to the radio terminal 1D. Further, as the transmission rate decrease data, an RG controlling unit 122 may transmit, to the radio terminal 10, a decrease command "Down" for instructing the decrease of the SG assigned to the radio terminal 10.

(Operations and Effects)

In the third embodiment, the base station 100 transmits, to the radio terminal 10, the transmission rate decrease data for instructing a decrease of the transmission rate, when the radio terminal 10 does not transmit the uplink user data by using the transmission rate assigned to the radio terminal 10.

Specifically, the base station 100 transmits, to the radio terminal 10, the transmission rate decrease data for instructing the decrease of the transmission rate (SG), when the usage rate (measured transmission rate/predicted transmission rate) is lower than the usage rate threshold.

As described above, the base station 100 transmits, to the radio terminal 10, the transmission rate decrease data for instructing the decrease of the transmission rate (SG), when the radio terminal 10 does not transmit the uplink user data by using the transmission rate assigned to the radio terminal 10.

Therefore, the transmission rate of the uplink user data can be properly controlled.

Fourth Embodiment

With reference to the accompanying drawings, a fourth embodiment will be described below. The following description is mainly given of differences between the second and third embodiments described above and the fourth embodiment.

Specifically, although it is not particularly mentioned In the third embodiment described above, in the fourth embodiment, a base station 100 transmits, to a radio terminal 10, the transmission rate control data (transmission rate decrease data) for instructing the decrease of the SG when a period for which a usage rate is lower than a usage rate threshold exceeds a predetermined period.

Note that, in this embodiment, it is assumed that the base station 100 (a counter 126 provided In a scheduling unit 120a) includes a third counter for counting a period for which the usage rate is lower than the usage rate threshold.
(Operations of Base Station (Cell))

Figure 12:
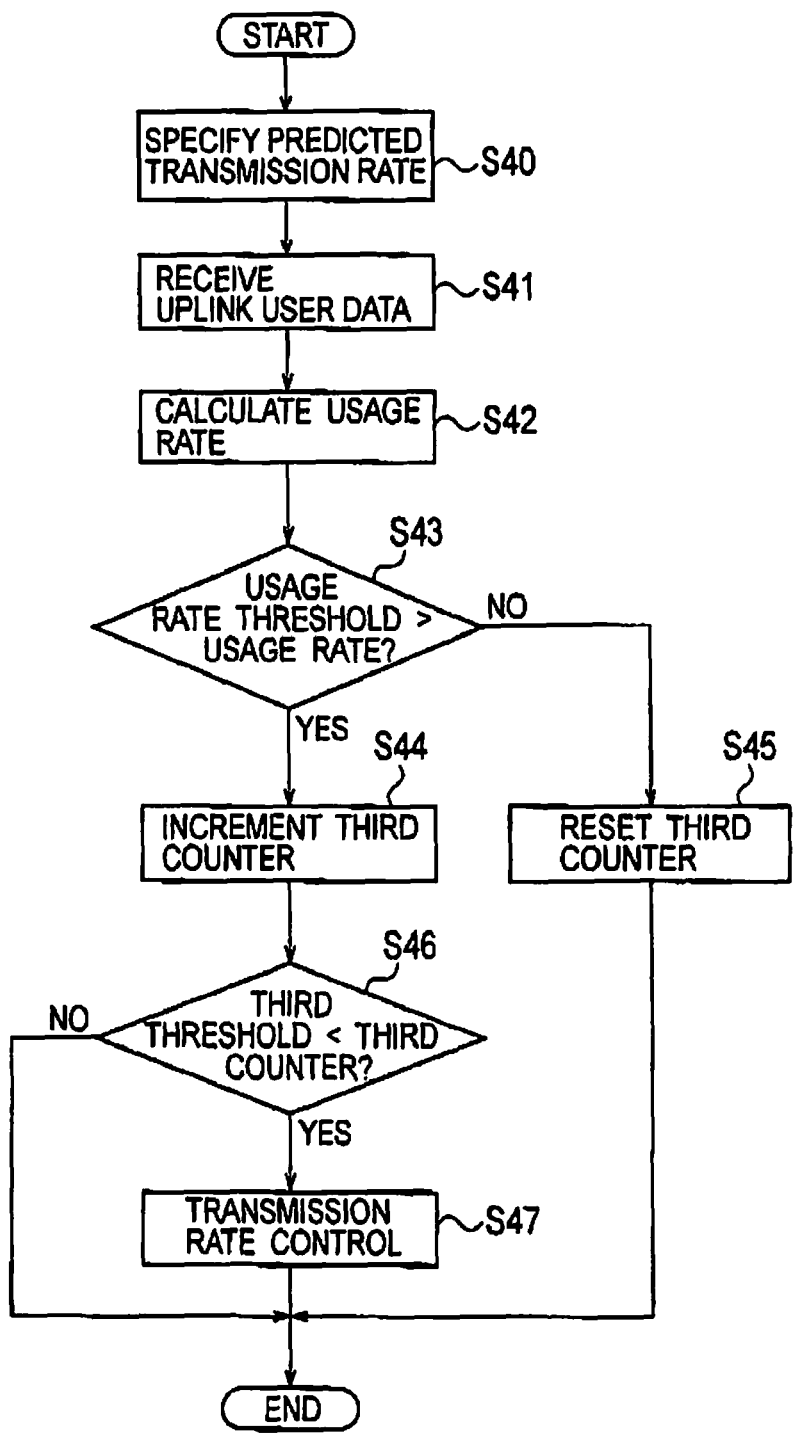
FIG. 12 is a flowchart showing operations of a base station 100 (cell) according to a fourth embodiment.

With reference to the accompanying drawings, description will be given below of operations of the base staffon (cell) according to the fourth embodiment. FIG. 12 is a flowchart showing operations of the base station 100 (cell) according to the fourth embodiment.

As shown in FIG. 12, in Step 40, the base station 100 specifies the predicted transmission rate by use of the SG assigned to the radio terminal 10.

In Step 41, the base station 100 receives the uplink user data from the radio terminal 10. Subsequently, the base station 100 specifies the measured transmission rate by an amount of the uplink user data received from the radio terminal 10.

In Step 42, the base station 100 calculates the ratio of the measured transmission rate to the predicted transmission rate (hereinafter referred to as the usage rate).

In Step 43, the base station 100 determines whether or not the usage rate is lower than a usage rate threshold. When the usage rate is lower than the usage rate threshold, the base station 100 moves to a processing of Step 44. On the other hand, when the usage rate is not lower than the usage rate threshold, the base station 100 moves to a processing of Step 45.

In Step 44, the base station 100 increments the third counter. In Step 45, the base station 100 resets the third counter. As described above, the third counter counts a period for which the usage rate is lower than the usage rate threshold.

In Step 46, the base station 100 determines whether or not the value counted by the third counter exceeds a third threshold. When the value counted by the third counter exceeds the third threshold, the base station 100 moves to a processing of Step 47. On the other hand, when the value counted by the third counter does not exceed the third threshold, the base station 100 terminates the processing.

In Step 47, the base station 100 transmits, to the radio terminal 10, the transmission rate control data (transmission rate decrease data) for instructing the decrease of the SG assigned to the radio terminal 10.
(Operations and Effects)

In the fourth embodiment, the base station 100 transmits, to the radio terminal 10, the transmission rate decrease data for instructing the decrease of the transmission rate (SG), when the period for which the usage rate (measured transmission rate/predicted transmission rate) is lower than the usage rate threshold exceeds the predetermined period.

Therefore, an excessive decrease of the transmission rate (SG) assigned to the radio terminal 10 can be suppressed.

Other Embodiments

The present Invention has been described by use of the embodiments described above. However, it should be understood that the present invention is not limited to the description and drawings which constitute a part of this disclosure. From this disclosure, various alternative embodiments, examples and operational technologies will become apparent to those skilled in the art.

For example, in the embodiments described above, various counters (the first to third counters) count various periods based on increment. However, the present invention is not limited thereto. The various counters may count various periods based on decrement.

Although it is not particularly mentioned in the embodiments described above, the measured transmission rate may be calculated by use of the number of active processes included in a sub-frame, a target BLER, or the like.

What is claimed is:

1. A radio communication system in which a radio terminal transmits, to a base station, uplink user data via an enhanced dedicated physical data channel and the base station transmits, to the radio terminal, transmission rate control data for controlling a transmission rate of the uplink user data, wherein the base station includes a base station side transmitter unit configured to transmit, to the radio terminal, transmission rate decrease data instructing a decrease of the uplink transmission rate assigned to the radio terminal, when the uplink user data is not transmitted from the radio terminal to the base station using the transmission rate assigned to the radio terminal, wherein the radio terminal includes a terminal side transmitter unit configured to transmit, to the base station, uplink scheduling information including at least buffer information of the radio terminal indicating a buffer amount of the uplink user data stored in the radio terminal, the base station further includes a determination unit configured to determine whether the buffer information is obtained, and the base station side transmitter unit transmits, to the radio terminal, the transmission rate decrease data when the buffer information is not obtained.

2. The radio communication system according to claim 1, wherein the base station further includes a determination unit configured to specify a usage rate of the transmission rate assigned to the radio terminal, on the basis of the uplink user data received from the radio terminal, and to determine whether the usage rate is lower than a usage rate threshold, and the base station side transmitter unit transmits, to the radio terminal, the transmission rate decrease data, when the usage rate is lower than the usage rate threshold.

3. The radio communication system according to claim 1, wherein the base station further includes a counter configured to count a period for which the buffer information is not obtained, and the base station side transmitter unit transmits, to the radio terminal, the transmission rate decrease data, when the period counted by the counter exceeds a predetermined period.

4. The radio communication system according to claim 2, wherein the base station further includes a counter configured to count a period for which the usage rate is lower than the usage rate threshold, and the base station side transmitter unit transmits, to the radio terminal, the transmission rate decrease data, when the period counted by the counter exceeds a predetermined period.

5. A radio communication method in which a radio terminal transmits, to a base station, uplink user data via an enhanced dedicated physical data channel and the base station transmits, to the radio terminal, transmission rate control data for controlling a transmission rate of the uplink user data, comprising:

transmitting, from the base station to the radio terminal, transmission rate decrease data instructing a decrease of the uplink transmission rate assigned to the radio terminal, when the uplink user data is not transmitted from the radio terminal to the base station using the transmission rate assigned to the radio terminal, transmitting, to the base station, uplink scheduling information including at least buffer information of the radio terminal indicating a buffer amount of the uplink user data stored in the radio terminal, determining whether buffer information of the radio terminal indicating that the uplink user data is stored in the radio terminal is obtained, and transmitting, from the base station to the radio terminal, the transmission rate decrease data when the buffer information is not obtained.

6. A base station configured to receive uplink user data from a radio terminal via an enhanced dedicated physical data channel, and to transmit, to the radio terminal, transmission rate control data for controlling a transmission rate of the uplink user data, comprising:

a base station side transmitter unit configured to transmit, to the radio terminal, transmission rate decrease data instructing a decrease of the uplink transmission rate assigned to the radio terminal, when the uplink user data is not transmitted from the radio terminal to the base station using the transmission rate assigned to the radio terminal; and a determination unit configured to determine whether buffer information of the radio terminal indicating that the uplink user data is stored in the radio terminal is obtained; wherein the base station side transmitter unit is adapted to transmit, to the radio terminal, the transmission rate decrease data when the buffer information is not obtained.

* * * * *